UNITED STATES PATENT OFFICE.

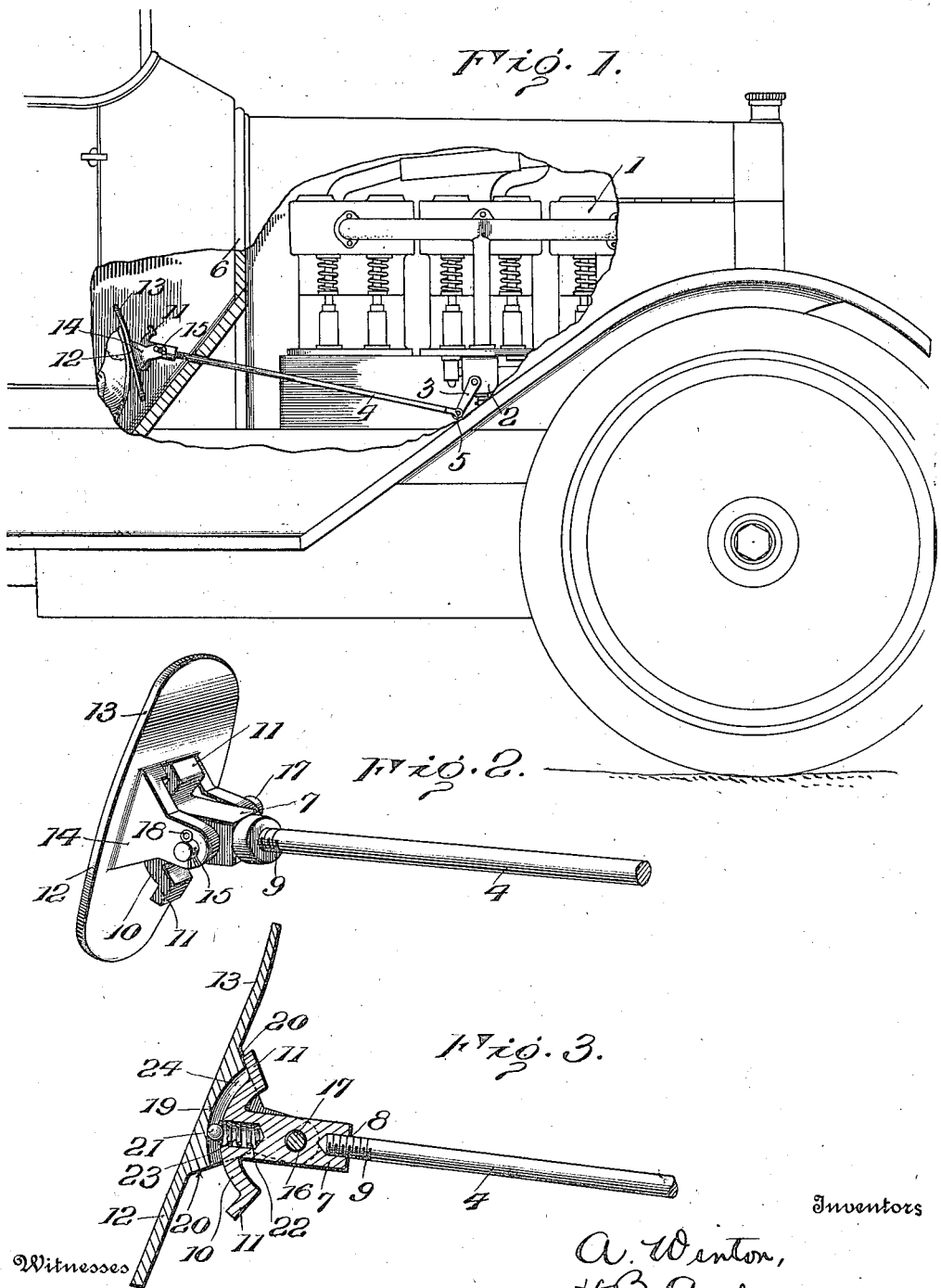

ALEXANDER WINTON AND HAROLD B. ANDERSON, OF CLEVELAND, OHIO, ASSIGNORS TO THE WINTON MOTOR CARRIAGE COMPANY, OF CLEVELAND, OHIO.

PEDAL.

1,153,743.  Specification of Letters Patent.  Patented Sept. 14, 1915.

Application filed October 31, 1914. Serial No. 869,575.

*To all whom it may concern:*

Be it known that we, ALEXANDER WINTON and HAROLD B. ANDERSON, citizens of the United States, residing at Cleveland, in the county of Cuyahoga and State of Ohio, have invented certain new and useful Improvements in Pedals, of which the following is a specification, reference being had therein to the accompanying drawing.

Our invention relates to improvements in pedals and particularly pertains to pedals used in the controlling system of an automobile.

The primary object of our present invention is to devise a pedal for use in an automobile which will be flat upon the foot irrespective of the position of the controlling member or the foot and which will thereby also accommodate itself to varying lengths of leg or foot of different operators.

A still further object of our invention is to devise a pedal which is adapted to accomplish the foregoing objects but still of simple construction and so assembled that it will not rattle and be noiseless when the machine is subjected to jar over rough roads.

Further objects and advantages of the present improvement will be pointed out in the following specification and drawing in which—

Figure 1 is a side elevation of the front portion of an automobile showing a portion of the hood and dash broken away and our improved pedal applied to the accelerator rod controlling the carbureter. Fig. 2 is an enlarged perspective view of a portion of the accelerator rod and our improved pedal applied thereto. Fig. 3 is a sectional view of the pedal.

For the purpose of illustration we have shown our improved pedal applied to the accelerator rod controlling the throttle of the carbureter and in this connection the pedal would be termed "an accelerator pedal." It is to be understood that this is only one adaptation of this invention, and it is readily understood that such a pedal may be used for the clutch, brake, "cut-out," etc.

Referring now to the drawings in which like reference numerals designate similar parts, 1 represents the engine of an automobile equipped with a usual carbureter 2. The carbureter is provided with the usual form of throttle (not shown) controlled from the outside by a lever 3. A rod 4 is provided which is pivotally connected to the lever 3 at the point 5 and extends rearwardly, terminating at a point within the dash 6 of the hood of the machine. Our improved pedal is applied to this inner end of the rod 4.

The pedal comprises a rectangular shank portion 7 provided with internal screw threads 8 in one end which mesh with external screw threads 9 on the end of the rod 4. The other end of the shank 7 is provided with a curved portion 10 which terminates at its ends in outwardly extending arms or lugs 11. These lugs form means whereby the foot-engaging member of the pedal, hereinafter to be described, is limited in its upward and downward movement. A foot-engaging member is pivoted to the shank 7. This member comprises a substantially ovel-shaped surface 12 which is shaped inwardly, to a slight degree, at its upper end at the point 13. The opposite side of the portion 12 is provided at its side edges and equidistant its ends with two parallel ears 14 which extend outwardly at right angles to the portion 12. The upper ends of these ears 14 are provided with registering openings 15. The ears 14 straddle the rectangular shaped shank 7, and the registering openings 15 in the upper ends thereof register with a hole 16 in the shank 7. A bolt 17 passes through these registering openings pivotally securing the member 12 to the shank 7 and is retained in this position by means of a cotter-pin 18 or other suitable means. The bottom portion of the member 12 between the ears 14 is shaped to form a curved surface 19 corresponding with the curved surface 10 of the shank 7. The extreme ends of the curved portion 19 serve to form shoulders 20 which engage the arms 11 carried by the shank as will be readily understood. These shoulders and coöperating arms 11 of the shank, provide means for limiting the upward and downward movement of the foot-engaging member. This limiting of the movement insures that the surface 12 will always be in a position to receive the foot of the operator. If the movement of the pedal was not limited in this manner, it might occupy such a position that it would be necessary to tap either on the top or bottom of it in order to bring it in a position for the reception of the operator's foot upon it.

The arc of the circle through which the pedal 12 can move is sufficient to accommodate varying lengths of leg of the operators. This is for the reason that the angle of the lower end of the leg of the operator from the knee to the ankle will vary dependent upon the height of the operator insomuch as the most comfortable position is with the foot at right angles to the leg.

The means for preventing any rattle of the pedal is accomplished by a ball 21 which engages the curved surface 19 of the portion 12. The ears 14 are of a length greater than the distance between the opening 16 in the shank and the periphery of the surface 10 so that a space 24 is left between the annular surface 19 and the annular surface 10 of a width slightly less than the diameter of a ball 21.

The ball is held in engagement with the annular surface 19 by means of a coil spring 22 situated in an opening 23 at the center of the curved surface 10 of the shank. The ball 21 fits into the extreme outward convolution of the spring 22 and is held therein so that the ball moves in and out of the opening 23, always remaining in the same position relative to the curved surface 10, but traversing the surface 19 of the member 12.

Having thus fully described our invention what we claim and desire to secure by Letters Patent is:

1. The combination with a longitudinally movable controlling member, of a foot pedal pivoted to the free end thereof to swing only in a vertical plane, the said pedal adapted to change its angle to correspond with the changing angle of the foot in contact therewith, and friction means between the controlling member and the pedal to hold the said pedal in any position in which it is left by the foot of the operator.

2. The combination with a longitudinally movable controlling member, of a foot pedal horizontally pivoted to the free end thereof to swing only in a vertical plane, the said pedal arranged to change its angle to correspond with the changing angle of the foot in contact therewith, the pedal and controlling member having abutting shoulders to limit the swinging movement of the said pedal.

3. The combination with a rearwardly extending and upwardly inclined controlling member, of a foot pedal horizontally pivoted to the free end thereof to swing only in a vertical plane, the said pedal arranged to change its angle to correspond with the changing angle of the foot in contact therewith, and friction means between the controlling member and the pedal to hold the said pedal in any position in which it is left by the foot of the operator.

4. A foot pedal comprising a shank, a foot engaging member horizontally pivoted thereto whereby the foot engaging member is movable only in a vertical plane, whereby the said member changes its angle to correspond with the changing angle of the foot in contact therewith, the foot engaging member and shank having abutting shoulders to limit the swinging movement of the pedal, and friction means between the shank and the foot engaging member to hold the said member in any position in which it is left by the foot of the operator.

5. The combination with a horizontally movable controlling member, of a foot pedal pivoted to the free end thereof to swing only in a vertical plane, whereby the said pedal will change its angle to correspond with the changing angle of the foot in contact therewith, and friction means carried by the free end of the controlling member and engaging the pedal to hold the said pedal in any position in which it is left by the foot of the operator.

6. A pedal comprising a shank separated lugs carried by the said shank a foot-engaging member comprising a flat surface, parallel ears carried thereby, said ears straddling the said shank, registering openings in the ears and shank, a bolt passing through the said openings, the parts arranged as and for the purpose described.

7. A pedal comprising a shank a foot-engaging member comprising a flat surface having a curved portion on one side, a pivotal means securing the said foot-engaging member to the shank, whereby the curved surface of the foot-engaging member and the end of the shank are opposite each other, and friction means carried by the shank engaging the curved surface of the foot-engaging member, the parts arranged as and for the purpose described.

8. A pedal comprising a shank a foot-engaging member comprising a flat surface having parallel ears on one side extending at right angles thereto, the portion of the foot-engaging member between the parallel ears curved in form, registering openings carried by the outer ends of the ears, an opening in the shank, said opening in the shank registering with the openings in the ears, a bolt passing through the said openings whereby the curved surface of the shank and the foot-engaging member are opposite, the distance between the center of the openings in the ears to the annular surface between the ears being greater than the distance between the center of the opening in the shank to the periphery of the annular surface of the shank, a coil spring within an opening in the shank, said opening being equidistant the ends of the curved surface of the shank and a ball fitting within the said coil spring and engaging the curved surface between the parallel ears of the foot-engaging member, the parts arranged as and for the purpose described.

In testimony whereof we hereunto affix our signatures in the presence of two witnesses.

ALEXANDER WINTON.
HAROLD B. ANDERSON.

Witnesses:
W. A. WALKEMEYER,
O. M. WHETTERBERGER.